(12) United States Patent
Kuenzi et al.

(10) Patent No.: US 11,825,386 B2
(45) Date of Patent: Nov. 21, 2023

(54) BROADCAST DELIVERY TECHNIQUES IN A WIRELESS NETWORK

(71) Applicant: Carrier Corporation, Palm Beach Gardens, FL (US)

(72) Inventors: Adam Kuenzi, Silverton, OR (US); Michael Lang, Oregon City, OR (US); Chih-Kuang Lin, Clonee (IE); Davide Villa, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 228 days.

(21) Appl. No.: 17/076,212

(22) Filed: Oct. 21, 2020

(65) Prior Publication Data

US 2021/0120373 A1   Apr. 22, 2021

(30) Foreign Application Priority Data

Oct. 21, 2019 (EP) ..................................... 19204402

(51) Int. Cl.
*H04W 4/06* (2009.01)
*H04W 4/23* (2018.01)
*H04W 4/80* (2018.01)
*H04W 76/11* (2018.01)

(52) U.S. Cl.
CPC .............. *H04W 4/06* (2013.01); *H04W 4/23* (2018.02); *H04W 4/80* (2018.02); *H04W 76/11* (2018.02)

(58) Field of Classification Search
CPC ........... H04W 4/06; H04W 4/23; H04W 4/80; H04W 76/11
See application file for complete search history.

(56) References Cited

U.S. PATENT DOCUMENTS

| | | | |
|---|---|---|---|
| 2005/0180356 A1* | 8/2005 | Gillies | H04W 40/02 370/445 |
| 2017/0099567 A1 | 4/2017 | Kwon et al. | |
| 2017/0134227 A1* | 5/2017 | Song | H04L 41/0806 |
| 2019/0174329 A1* | 6/2019 | Keating | H05B 47/19 |
| 2019/0288942 A1 | 9/2019 | Liao et al. | |
| 2019/0320377 A1* | 10/2019 | Maruta | H04W 4/38 |

FOREIGN PATENT DOCUMENTS

WO    2004053940 A2    8/2006

OTHER PUBLICATIONS

European Search Report for Application No. 19204402.2, dated May 12, 2020, 8 Pages.

* cited by examiner

*Primary Examiner* — Ricky Q Ngo
*Assistant Examiner* — Stephen N Steiner
(74) *Attorney, Agent, or Firm* — CANTOR COLBURN LLP

(57) ABSTRACT

A method for handling a broadcast data packet using a network (300) including a plurality of nodes (NH, N1, N2, N3, N4, N5, N6), the method including: receiving, at a sending node, the broadcast data packet; checking, at the sending node, whether the broadcast data packet has been received at the sending node on a previous occasion, wherein if the sending node has not previously received the broadcast data packet the sending node enters a broadcast delivery mode, the broadcast delivery mode including: switching to a scan mode to listen for advertisements from other nodes in the network; starting a timer; wherein upon receipt of an advertisement from a neighbouring node the sending node sends an instance of the broadcast data packet to the neighbouring node and resets the timer.

14 Claims, 3 Drawing Sheets

BROADCAST DELIVERY TECHNIQUES IN A WIRELESS NETWORK

FOREIGN PRIORITY

This application claims priority to European Patent Application No. 19204402.2, filed Oct. 21, 2019, and all the benefits accruing therefrom under 35 U.S.C. § 119, the contents of which in its entirety are herein incorporated by reference.

TECHNICAL FIELD OF INVENTION

The present disclosure relates to Bluetooth networks, particularly to methods for broadcasting data in a Bluetooth low energy network.

BACKGROUND OF THE INVENTION

The Bluetooth® Low Energy (BLE) specification is a set of standards for wireless network technologies operating within the 2.4-2.4835 GHz Industrial, Scientific and Medical (ISM) band. BLE is designed to considerably reduce power consumption compared to legacy, or "Classic", Bluetooth® devices.

Applications for the BLE specification include healthcare, security, fitness, and home entertainment. Within these applications, devices may utilise Bluetooth mesh profiles to communicate with other BLE devices in a network. Each device in the network can transfer data between other devices in the network, creating a so-called "mesh".

According to the specification, a BLE device operates across 40 channels in the 2.4 GHz band, each mapped onto a set of RF (radio frequency) channel index values 0, 1, ..., 39. Channels 0 to 36 are used for the transmission of data while channels 37, 38, and 39 are for the transmission of advertising (ADV) events.

The term "node" as used herein may refer to any device that may have BLE capability. Such devices may include smartphones, smart plugs, light bulbs, laptops, home entertainment devices or any other device that can connect to a BLE network. A node may also be able to communicate in other wireless networks, such as Wi-Fi® networks or cellular networks. A node may also be able to communicate via the Internet through such networks.

In the status quo, techniques for broadcasting data to nodes in a network may be time and energy intensive and may use routing tables that are not up to date, which leads to network updates being sent inefficiently.

SUMMARY OF THE INVENTION

Viewed from a first aspect, the invention provides a method for handling a broadcast data packet using a network comprising a plurality of nodes, the method comprising: receiving, at a sending node, a broadcast data packet; checking, at the sending node, whether the broadcast data packet has been received at the sending node on a previous occasion, wherein if the sending node has not previously received the broadcast data packet the sending node enters a broadcast delivery mode, the broadcast delivery mode comprising: switching to a scan mode to listen for advertisements from other nodes in the network; starting a timer; wherein upon receipt of an advertisement from a neighbouring node the sending node sends an instance of the broadcast data packet to the neighbouring node and resets the timer.

An advantage of the method of the first aspect is that nodes in a network are able to forward on broadcasted information without the need for routing tables or any other a priori information, meaning that broadcasted data may still be sent through a network even if a routing table is not up to date or is not available for whatever reason. A network with the capability to broadcast using this method can hence be more resilient than networks that are only able to broadcast using a routing table.

In some examples the network is not constrained to use only the method of the first aspect. The network may in fact use this method as a fall-back for situations where a routing table cannot be used, i.e. due to an absence of an up to date table. A network in accordance with the invention may hence be provided with the ability to carry out the above method as one of several broadcast delivery techniques. The network may be arranged to select the best technique for a given situation, such as using a routing table with sequential unicast delivery if an up to date routing table is available.

Viewed from a second aspect, the invention provides a Bluetooth Low Energy (BLE) network comprising multiple nodes and being for handling a broadcast data packet, the network comprising: a sending node; and one or more neighbouring nodes, wherein the neighbouring nodes are a one-hop distance from the sending node; wherein the sending node is configured to receive the broadcast data packet and check whether the broadcast data packet has been received at the sending node on a previous occasion, and wherein if the sending node has not previously received the broadcast data packet the sending node enters a broadcast delivery mode, the broadcast delivery mode comprising: switching to a scan mode to listen for advertisements from other nodes in the network; starting a timer; wherein upon receipt of an advertisement from a neighbouring node the sending node sends an instance of the broadcast data packet to the neighbouring node and resets the timer.

Viewed from a third aspect, the invention provides a computer program product containing instructions that, when executed within a Bluetooth Low Energy network comprising multiple nodes, will configure the network to operate in accordance with the method of the first aspect.

The following describes optional features that may be combined with the method of the first aspect, the network of the second aspect or the computer program product of the third aspect.

The BLE devices may include any device that has the ability to communicate with other devices using Bluetooth low energy transmissions. Such devices may include smartphones, smart plugs, light bulbs, laptops, access control systems, and home entertainment devices. BLE devices may be members of a BLE network. The BLE network may comprise a head node or gateway, where the head node is able to perform protocol conversions communicate data from the BLE network to another network that the head node is connected to. Other networks may include cellular networks, the Internet, a local intranet, and cloud networks.

In the BLE network, the BLE devices that are members of the network may be called nodes. The network may comprise any number of nodes and may be distributed so that the head node is connected to at least one node. Each node in the network may be connected directly to the head node or is connected to the head node via at least one other node. In this way, the head node is able to communicate with all nodes in a BLE network, and vice versa.

All nodes in the network may be considered to be downstream or downlink with respect to the head node and, conversely, the head node may be considered upstream or uplink of other nodes in the network. The structure of the network may be that data can travel from the head node and through other intermediary nodes before reaching a destination node. In this way, intermediary nodes may be upstream of some nodes and may be downstream of other nodes. A node that is at the edge of a network may be called an end node. Data that is transmitted from the head node to an intermediary node or end node may be considered to be travelling downstream or downlink. Data that is transmitted from an end node or intermediary node in the direction of the head node may be considered to be travelling upstream or uplink.

The BLE network may be configured to allow BLE devices to join and leave networks on the fly. The skilled person would readily understand that BLE networks may be configured to be restructured to account for new devices joining the network or current devices leaving the network. The skilled person would also readily understand that a BLE network may be configured to restructure itself to account for changes in the physical location of BLE devices in the network and/or optimise the network for efficient data transfer between devices.

The distance any particular node is away from the head node may be defined by the number of nodes data must travel through to reach that particular node. For example, a node that directly communicates with the head node may be considered one "hop" away from the head node. Likewise, a first node that communicates with the head node via a second node may be considered to be two "hops" away from the head node. In this latter case, the second node may be considered to be downstream of the head node and also upstream of the first node. In this way, it is possible to define how many hops any particular node is away from the head node. The number of hops has no bearing on the physical distance between nodes. Nodes that are one hop away from a particular node may be called neighbours of that particular node.

The hop distance for a particular node may change due to a reconfiguration of the network. Such a reconfiguration may occur for any number of reasons including, but not limited to: optimisation of the network; in response to the number of nodes in the network changing; and the physical movement of nodes in the network.

The hop distance for a particular node may be stored in the memory of said node as identifying data for that node. Other identifying data may include a node ID (identification) number or a MAC (media access control) address for the node. The node may store identifying data for other nodes in the network, such as neighbouring nodes. The node ID may be a unique identification of the node.

A path between two connected nodes may be part of a longer path from an initial sending node to a destination node, where the sending node may be considered as a node from which a data packet originated. Alternatively, the sending node may be considered as any node from which data was sent. The destination node may be considered to be a node to which a data packet is intended to reach. Alternatively, a destination node may be any node that receives a data packet. The path for a data packet may comprise multiple hops through multiple nodes to reach a destination node. The node(s) on a path between a sending node and a destination node may be called intermediary nodes. The terms "path" and "route" may be used interchangeably.

Typically, a path between a sending node and a destination node may require as few intermediary nodes as possible, and may not even require any intermediary nodes at all. There may be multiple paths from any one node in the network for data to be sent along to reach a destination node. A node would typically select a path based upon the lowest hop count, but may also determine which path to use by considering other parameters.

Data may be broadcast from a head node to all other nodes in the network. Alternatively, the broadcast data may only be broadcast to a subset of nodes in the whole network. Additionally, nodes within the network may be configured to broadcast data to all or a sub set of nodes within the network. Such broadcast actions may take place in the event of network updates or other such notifications.

To exemplify the method, we may consider the situation in which the head node has a data packet pending broadcast to all nodes in a network. The pending data packet may be termed a "broadcast packet". The broadcast may be handled as a sequentially unicast delivery. This means that the sending node (the head node in this case) establishes a connection with each destination node in the network individually, sends the same instance of the broadcast data packet each time to each destination node, then disconnects with a destination node before connecting to a new one. An advantage of sequentially unicasting broadcasting data is that multiple connections do not need to be opened and maintained to send the data, and so each node saves energy.

Alternatively, the data may be broadcast in a multicast manner, meaning that the sending node may connect to more than one destination node at any one time to send data to more than one destination node at once.

The method for handling a broadcast data packet using a network comprising a plurality of nodes, the method involves receiving, at a sending node, a broadcast data packet. The sending node then checks whether the broadcast data packet has been received at the sending node on a previous occasion, wherein if the sending node has not previously received the broadcast data packet the sending node enters a broadcast delivery mode. The broadcast delivery mode comprises the sending node switching to a scan mode to listen for advertisements from other nodes in the network and starting a timer at the sending node. In the scan mode, the sending node may scan for advertisement packets from neighbours and, upon the reception of an advertisement packet from a neighbouring node, the sending node may then send a connection request to the neighbouring node establishing in this way communication between the sending node and the neighbouring node, which may then be termed a "receiving node". At this point, the receiving node may switch to a listening mode in the data channel waiting for the broadcast message while the sending node may stay in a scan mode in order to receive advertisement packets from other neighbouring nodes so that connections may also be established with them. A scan mode is the mode in which a node is able to receive advertising packets from other nodes. After the sending node has established connections with a subset or with all the neighbours, it may then switch in the data channel and send the broadcast packet. The timer is then reset. This method may be known as the "timer method".

Additionally, the sending node may keep track of the IDs of neighbouring nodes to which the sending node has delivered the message. This has an added advantage of ensuring that the broadcast packet is not sent multiple times to the same neighbouring node. Also, if the sending node receives an advertisement from a neighbour to whom it has already delivered the same broadcast packet before, it may be configured to ignore the advertisement, without resetting the timer.

A node that receives broadcast data may send an acknowledgement packet to the node broadcasting the data. The acknowledgement function is to provide end-to-end communication assurance between broadcasting node and receiving nodes. The acknowledgement packet format is compliance with BLE specifications in active scan mode or data mode.

The length of time the timer runs for may depend on a number of non-limiting parameters, such as: density of the network; background activities; and transmission frequency of the advertisements performed by the nodes (this frequency is related to the advertisement interval value in BLE terms, which is the time between two consecutive advertisement events). For example, with a network comprising 120 nodes, with advertisement intervals of 1 second or 100 milliseconds, and a range of 1-hop neighbours between 9 and 22, a proper timer would be 2 seconds, which is a good trade-off between accuracy, i.e. total nodes reached, and latency. Networks having different values for these parameters may have timer durations of different lengths.

Additionally, a sending node may make use of a routing table to determine which nodes it neighbours and which paths are available to the broadcast node to most efficiently send instances of the broadcast data packet to each node in the network. The routing table contains information on about the topology of the network. The head node may extract the unique identifications of one or more nodes connected to the head node. That is, the head node may extract unique identifications of nodes within the network that have a path to the head node. The head node may then establish a connection with one of these nodes, send an instance of the broadcast data packet to that node, and then terminate the connection to that node before establishing a connection with another neighbouring node. Alternatively, the head node may connect with another neighbouring node prior to terminating the connection from a first neighbouring node. Similarly, the nodes that receive the broadcast data packet from the head node may check the routing table to acquire the unique node identifications of nodes further downstream to connect with and send the broadcast data packet to. This process may continue until the broadcast data packet reaches the leaf nodes in the network, that is, nodes which do not have any other nodes downstream from them. This method may be termed the "routing table method".

The routing table method is applicable to any node in the network. That is, the broadcast data does not necessarily need to be broadcast from the head node; it may be broadcast from any node in the network that has data to broadcast.

An advantage of the routing table method of broadcasting data is that the number of messages sent is minimised and avoids redundant messages, but it requires that the paths are active and up-to-date.

This method may be used if an up-to-date routing table is available to the network instead of the method using the timer above. An advantage of the routing table method over the timer method is that fewer messages need to be sent and so more energy is saved at each node. An advantage of the timer method over the routing table method is that the timer method may be carried out in the event that an up-to-date routing table is not available to the network.

The network may be configured to use one of a sequentially unicast method or a multicast method for broadcasting data and the network may be configured to switch between these two methods depending on the amount of energy available at particular nodes in the network. Additionally, the network may be configured to switch between the timer method and the routing table method for how broadcast data is propagated through the network. The network may then select the best technique for a given situation, such as using the routing table method with sequential unicast delivery if an up-to-date routing table is available but battery power at a particular node is low. Indeed, the network may use elements of any of these techniques to effectively and efficiently distribute broadcast data packets. For instance, the broadcast may start from the head node using the sequential unicast method and, while the broadcast data packet is being delivered throughout the network, a status in the routing table may change and cause the network to switch to the timer method to continue the broadcast of the broadcast data packet.

BRIEF DESCRIPTION OF THE DRAWINGS

Certain embodiments of the disclosure will now be described by way of example only and with reference to the accompanying drawings in which.

DETAILED DESCRIPTION

Figure 1:
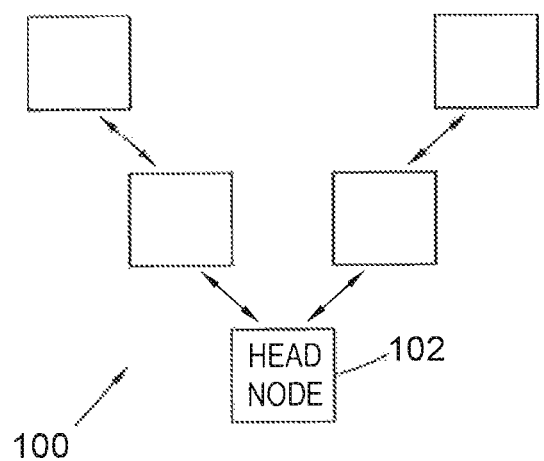
FIG. 1 shows an exemplary BLE network.

FIG. 1 shows an example BLE network 100 where the network 100 is depicted as a tree. A head node 102 forms the "root" of the network 100 and devices in the BLE network form "branches" in the network. Some BLE devices are not directly connected to the head node 102; instead they are connected via a branch node. This means that any transmissions sent from the head node 102 may have to be communicated through another BLE node before the transmission reaches its destination node.

Figure 2:
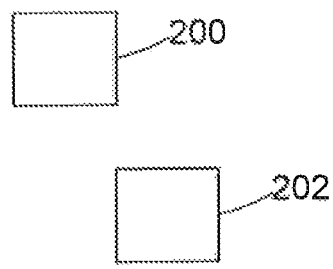
FIG. 2 shows a pair of BLE devices.

FIG. 2 shows a first node 200 and a second node 202. The first node 200 and the second node 202 may be any two adjacent nodes in a BLE network 100. Here, the term "adjacent" means that the first node 200 and second node 202 are configured to communicate with one another directly, rather than through an intermediate node. Each node may be able to determine its position in a BLE network 100 relative to other nodes by storing identifying information about its neighbours. Neighbouring nodes may be defined as those that are immediately connected to a node in the network 100. Identifying information may include hop distance and a unique node ID.

Figure 3:
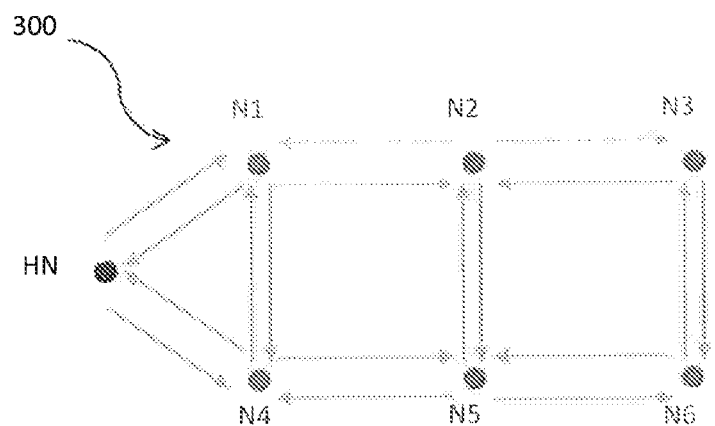
FIG. 3 illustrates an example of broadcast delivery by using the timer approach in an exemplary network.

The timer method of broadcasting data will now be described as acting on a network 300 as depicted in FIG. 3. This example network 300 comprises a head node NH and a plurality of nodes N1-N6, where nodes N1 and N4 are one hop from the head node NH. Nodes N2 and N5 are, respectively, two hops from the head node NH via N1 and N4, and nodes N3 and N6 are, respectively, three hops from the head node NH via N2 and N5. Additionally, the nodes N1 and N4 are one hop from one another, as are node N2 and N5, and nodes N3 and N6.

The head node NH has a pending data broadcast data packet to send. In the event that a downstream node receives a broadcast data packet, the node is configured to check whether it has received an instance of the same broadcast packet on a previous occasion. If so, the node takes no further action in relation to the broadcast packet. That is, the node does not send the packet on, or record the data, or take any other action in relation to the previously received data.

If, on the other hand, the node has not previously received the broadcast data, the node is configured to enter a broadcast delivery mode. At this point, it may be useful to call the node that has entered the broadcast delivery mode a "sending node". The broadcast delivery mode involves starting, at the sending node, a timer and switching to a scan mode to listen for advertisements from other nodes in the network 300. Upon receipt of an advertisement from, for example, a neighbouring node of the sending node, the sending node establishes a connection with the neighbouring node and an instance of the broadcast data packet is sent to the neighbouring node. An instance of the broadcast data packet is a copy of the original broadcast data packet that is generated at the sending node.

After the broadcast data packet is sent, the timer is reset. While the sending node is in the broadcast delivery node and the timer is running, the sending node may receive any number of advertisements from any number of neighbouring nodes, each time the sending node sending an instance of the broadcast data packet to the neighbouring node it has a connection with and then resetting the timer. As previously mentioned, the sending node may be configured to store the node ID of those neighbouring nodes to which broadcast data packets have already been sent from the sending node. If the sending node receives an advertisement packet from a neighbouring node to which the sending node has already delivered the same broadcast packet before, the sending node may ignore this advertisement packet without resetting the timer.

When the timer expires, the sending node exits broadcast delivery mode and no longer listens for advertisements from neighbouring nodes.

The arrows in FIG. 3 illustrate how a broadcast message may propagate through the network, wherein each node is attempting to send broadcasting packets to each of their neighbouring nodes in accordance with the above method.

The network 300 is configured to switch between the timer method described above and a routing table method, depending on the status of the network 300. The routing table method utilises a routing table, and so this method may be preferred by the network 300 for broadcasting data packets if the routing table is available and up-to-date. The network 300 may instead use the timer method when the routing table is not available or up-to-date.

Figure 4:
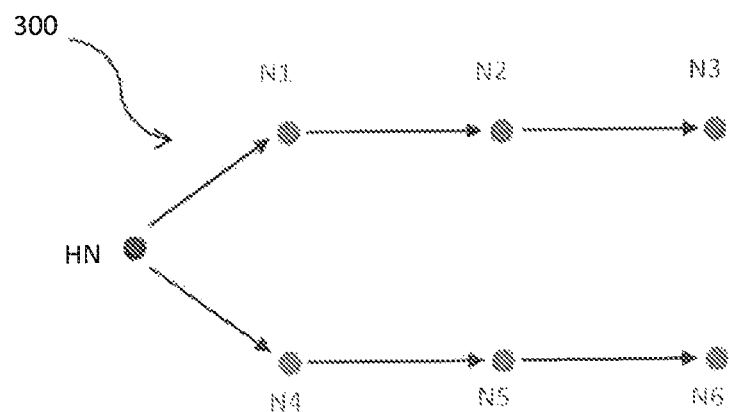
FIG. 4 illustrates an example of broadcast delivery by using the routing table approach in an exemplary network.

FIG. 4 shows the same network 300 as in FIG. 3 and illustrates how the routing table method is carried out as being broadcast from the head node NH. The head node NH extracts the unique identifications of nodes N1 and N4, which are connected to the head node NH, from the routing table. The head node NH then establishes a connection with one of these nodes, sends an instance of the broadcast data packet to that node, and then terminates the connection to that node before establishing a connection with the other neighbouring node. Alternatively, the head node may connect with the other neighbouring node prior to terminating the connection from the first of neighbouring nodes N1 and N4.

Then, nodes N1 and N4 which have received the broadcast data packet from the head node NH check the routing table to acquire the unique node identifications of nodes N2 and N5, which are connected immediately downstream from nodes N1 and N4, respectively. N1 and N4 connect with and send the broadcast data packet to the respective downstream nodes N2 and N5. This process continues until the broadcast data packet reaches the leaf nodes in the network 300, in this case nodes N3 and N6, that is, nodes which do not have any other nodes downstream from them. Thus, nodes N3 and N6 do not broadcast the data packet as there are no nodes downstream from these nodes.

The routing table method may be performed in addition to or as an alternative to the timer method. The network 300 is configured to switch between these two methods.

Figure 5:
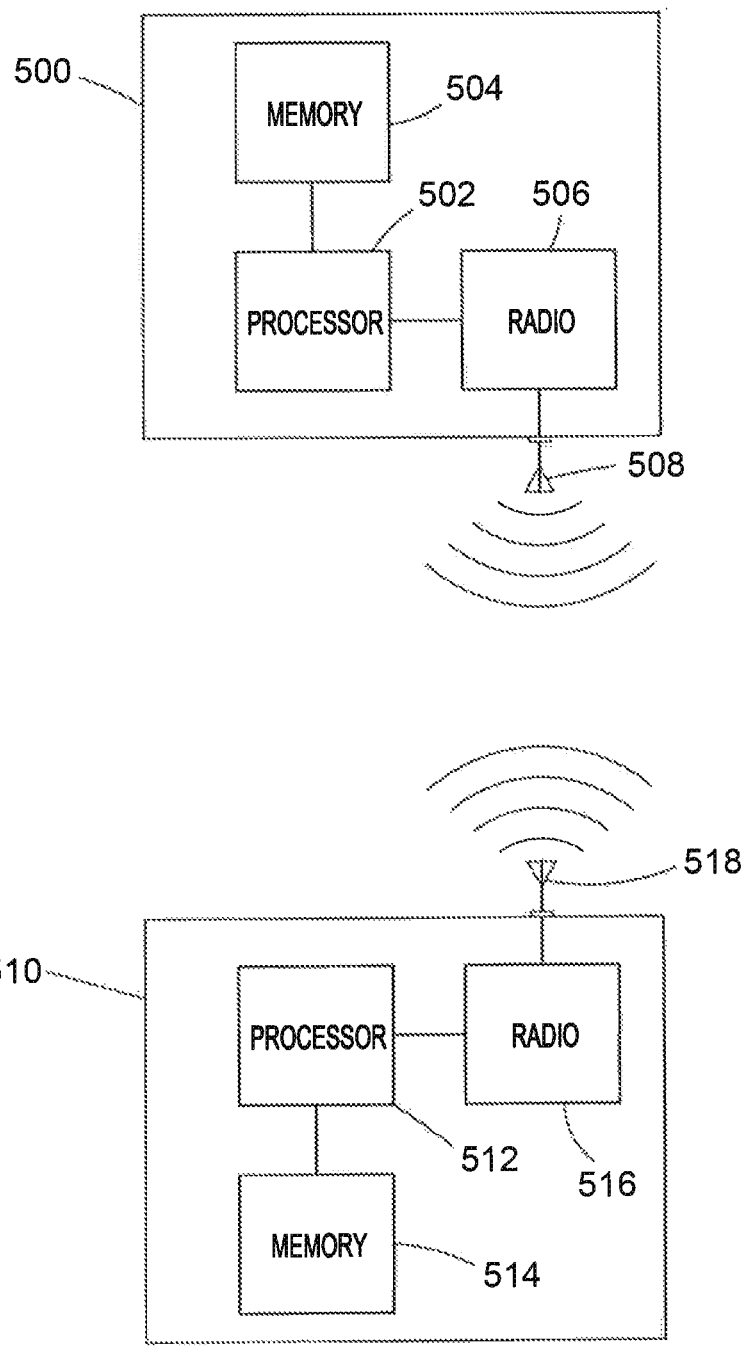
FIG. 5 shows a schematic view of a pair of BLE devices.

FIG. 5 illustrates a pair of BLE devices 500, 510 which may utilise the methods discussed above. The BLE devices 500, 510 might be any suitable known type of device, and they are modified compared to the known devices to operate in accordance with a method as set out above. A first BLE device 500 comprises a processor 502, a memory unit 504, a radio 506, and an antenna 508. Computer program products for performing the methods described herein may be stored as an application in the memory unit 504. The memory unit 504 can be a hard drive, solid state or optical memory source. The processor 502 is configured to access and execute software, applications, and data stored on the memory unit 504.

The radio 506 is configured to receive and transmit BLE signals via the antenna 508. The processor 502 is configured to interface with the radio 506 and the application may be configured to control the radio 506 and antenna 508 when executed on the processor 502.

A second BLE device 510 includes similar hardware and operations to the first BLE device 500. The antenna 508 of the first BLE device 500 is configured to communicate with the antenna 518 of the second BLE device 510.

What is claimed is:

1. A method for handling a broadcast data packet using a network comprising a plurality of nodes, the method comprising:
   receiving, at a sending node, the broadcast data packet;
   checking, at the sending node, whether the broadcast data packet has been received at the sending node on a previous occasion, wherein if the sending node has not previously received the broadcast data packet the sending node enters a broadcast delivery mode, the broadcast delivery mode comprising:
      switching to a scan mode to listen for advertisements from other nodes in the network;
      starting a timer at the sending node;
      wherein upon receipt of an advertisement from a neighbouring node the sending node sends an instance of the broadcast data packet to the neighbouring node and the sending node resets the timer; and
      wherein when the timer expires, the sending node exits the broadcast delivery mode.

2. The method of claim 1, further comprising transmitting, from a head node, the broadcast data packet.

3. The method of claim 2, wherein the broadcast data packet is transmitted from the head node as a unicast delivery.

4. The method of claim 2, wherein the broadcast data packet is transmitted from the head node as a multicast delivery method.

5. The method of claim 1, wherein if the broadcast has been previously received at the sending node, the sending node ignores the broadcast data packet.

6. The method of claim 1, wherein sending an instance of the broadcast data comprises generating a copy of the broadcast data packet at the sending node.

7. The method of claim 1, wherein if the sending node has not previously received the broadcast data packet, the sending node stores the data from the broadcast data packet.

8. The method of claim 1, wherein the sending node may establish a connection with one or more additional neighbouring nodes prior to sending an instance of the broadcast data packet.

9. The method of claim 8, wherein instances of the broadcast data packet are sent to each of the neighbouring nodes connected to the sending node at about the same time.

10. The method of claim 1, wherein the sending node stores information about neighbouring nodes, the information including whether the sending node has previously sent an instance of a broadcast data packet to a particular neighbouring node on a previous occasion during activation of the broadcast delivery mode.

11. The method of claim 1, wherein the network is configured to switch to a routing table method, the routing table method comprising:
- extracting, at the sending node, unique identifications of one or more nodes connected to the sending node;
- establishing a connection between the sending node and one of its neighbouring nodes for which it has extracted a unique identification;
- sending an instance of the broadcast data packet to that neighbouring node.

12. A Bluetooth Low Energy (BLE) network comprising multiple nodes and being for handling a broadcast data packet, the network comprising:
- a sending node; and
- one or more neighbouring nodes, wherein the neighbouring nodes are a one-hop distance from the sending node;

wherein the sending node is configured to receive the broadcast data packet and check whether the broadcast data packet has been received at the sending node on a previous occasion, and wherein if the sending node has not previously received the broadcast data packet the sending node enters a broadcast delivery mode, the broadcast delivery mode comprising:
- switching to a scan mode to listen for advertisements from other nodes in the network;
- starting a timer at the sending node;

wherein upon receipt of an advertisement from a neighbouring node the sending node sends an instance of the broadcast data packet to the neighbouring node and the sending node resets the timer, and wherein when the timer expires, the sending node exits the broadcast delivery mode.

13. A Bluetooth Low Energy (BLE) network, wherein the network is configured to operate in accordance with the method of claim 1.

14. A non-transitory computer readable medium containing instructions that, when executed within a Bluetooth Low Energy network comprising multiple nodes, will configure the network to operate in accordance with the method of claim 1.

* * * * *